(12) United States Patent
Kwon et al.

(10) Patent No.: US 12,522,162 B2
(45) Date of Patent: Jan. 13, 2026

(54) SYSTEM AND METHOD FOR CONTROLLING A VEHICLE

(71) Applicants: HYUNDAI MOTOR COMPANY, Seoul (KR); KIA CORPORATION, Seoul (KR)

(72) Inventors: Young Hoon Kwon, Seoul (KR); Kwang Hae Ye, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 95 days.

(21) Appl. No.: 18/629,420

(22) Filed: Apr. 8, 2024

(65) Prior Publication Data
US 2025/0074339 A1    Mar. 6, 2025

(30) Foreign Application Priority Data
Sep. 5, 2023  (KR) .......................... 10-2023-0117812

(51) Int. Cl.
*B60R 16/023*    (2006.01)
(52) U.S. Cl.
CPC ...... *B60R 16/0231* (2013.01); *B60R 16/0239* (2013.01)

(58) Field of Classification Search
CPC . B60R 16/0231; B60R 16/0239; B60R 16/02; B60R 16/023; B60R 16/03; B60R 16/0238; H04L 12/40039; H04L 2012/40273; B60Y 2400/3084
See application file for complete search history.

(56) References Cited

U.S. PATENT DOCUMENTS

| | | | |
|---|---|---|---|
| 2010/0165529 A1* | 7/2010 | Turpin | H02H 3/087 361/87 |
| 2023/0264641 A1* | 8/2023 | Staudt | B60W 10/26 701/22 |

* cited by examiner

*Primary Examiner* — Behrang Badii
(74) *Attorney, Agent, or Firm* — Lempia Summerfield Katz LLC

(57) ABSTRACT

A system for controlling a vehicle includes a fuse block connected to a vehicle controller and configured to supply power to the vehicle controller. The system also includes a power control device that includes a sensor and a processor. The sensor is configured to sense a current of the fuse block connected to the vehicle controller. The processor is configured to determine the vehicle controller as being a wake-up vehicle controller when an electrical signal is input from the sensor as change in current of the fuse block is sensed by the sensor.

20 Claims, 10 Drawing Sheets

SYSTEM AND METHOD FOR CONTROLLING A VEHICLE

CROSS-REFERENCE TO RELATED APPLICATION

This application claims the benefit of and priority to Korean Patent Application No. 10-2023-0117812, filed on Sep. 5, 2023, the entire contents of which are incorporated herein by reference.

TECHNICAL FIELD

The present disclosure relates to a system and a method for controlling a vehicle. More particularly, the present disclosure relates to a system and a method for controlling a vehicle, capable of detecting a cause of discharging a battery due to a parasitic current.

BACKGROUND

The statements in this section merely provide background information related to the present disclosure and may not constitute prior art.

A vehicle is typically equipped with a low-voltage battery to supply power for a start-on/off operation or for the operation of various convenience devices in the vehicle.

Recently, with increase in the use of controllers operating in a key-off state, parasitic currents in the vehicle have increased. Some of the controllers that cause the parasitic currents in a vehicle are supplied with power through a low-voltage battery.

When one of the controllers supplied with the power through the low-voltage battery first wakes up, remaining controllers connected to each other over the same network also wake up, thereby increasing the parasitic current in the vehicle, which discharges the low-voltage battery.

In addition, although the cause of discharging the low-voltage battery should be detected to prevent the low-voltage battery from being discharged, the communication state of devices employing a function of detecting a non-sleep controller often fail to be monitored continuously. Accordingly, a device that first wakes up fails to be identified and there is a limitation in finding the cause of discharging the battery.

SUMMARY

The present disclosure has been made to solve the above-mentioned problems occurring in the prior art while advantages achieved by the prior art are maintained intact.

An aspect of the present disclosure provides a system and a method for controlling a vehicle, capable of detecting a cause of discharging a battery. The system and method identify a controller that was first woken up (sometimes referred herein as a "first wake-up controller") by waking up a powernet domain controller in response to sensing a change in current consumed by a vehicle controller powered by a low-voltage battery.

Another aspect of the present disclosure provides a system and a method for controlling a vehicle, capable of monitoring a sleep state of vehicle controllers in a wake-up state by the first wake-up controller, and detecting the cause of making non-sleep vehicle controllers fail to sleep, after the first wake-up controller is determined.

Another aspect of the present disclosure relates to a system and a method for controlling a vehicle, capable of reducing costs and time spent to analyze the cause of discharging a battery by storing the cause of discharging the battery in a memory, and when the cause of discharging the battery is detected, outputting the cause of discharging the battery through an output device.

The technical problems to be solved by the present disclosure are not limited to the aforementioned problems, and other technical problems not mentioned herein should be clearly understood from the following description by those having ordinary skill in the art to which the present disclosure pertains.

According to an aspect of the present disclosure, a system for controlling a vehicle is provided. The system includes a fuse block connected to a vehicle controller and configured to supply power to the vehicle controller. The system also includes a power control device that includes a sensor and a processor. The sensor is configured to sense a current of the fuse block connected to the vehicle controller. The processor is configured to determine the vehicle controller as a wake-up vehicle controller when an electrical signal is input from the sensor as change in current of the fuse block is sensed by the sensor.

According to an embodiment, the sensor is electrically connected to the processor and is configured to output the electrical signal to the processor in response to sensing that a current output of the fuse block is equal to or greater than a reference value.

According to an embodiment, the processor may store an indication of the wake-up vehicle controller in the memory.

According to an embodiment, the processor may determine whether a message transmitted from the wake-up vehicle controller can be received.

According to an embodiment, when the message transmitted from the wake-up vehicle controller can be received, the processor may determine a first wake-up controller based on the message transmitted from the wake-up vehicle controller.

According to an embodiment, when the message transmitted from the wake-up vehicle controller cannot be received, the processor may wake up a communication control device.

According to an embodiment, the processor may wake up the communication control device by outputting an electrical signal to the communication control device.

According to an embodiment, the processor may receive a message transmitted from the wake-up vehicle controller through the communication control device. The processor may determine the first wake-up controller based on the message received through the communication control device.

According to an embodiment, the processor may receive a message from each vehicle controller maintained in a communication state and determine a non-sleep cause based on the received message, when communication of the vehicle controller is maintained at a time point at which a specific time is elapsed after the first wake-up controller is determined.

According to an embodiment, the processor may output the first wake-up controller and the non-sleep cause.

According to another aspect of the present disclosure, a method for controlling a vehicle is provided. The method includes sensing, by a sensor, a current of a fuse block connected to a vehicle controller and configured to supply power to the vehicle controller. The method also includes waking up a power control device when an electrical signal is provided from the sensor as change in current of the fuse block is sensed by the sensor. The method additionally includes determining, by the power control device, the vehicle controller, connected to the fuse block related to the change in current, as being a wake-up vehicle controller.

According to an embodiment, waking up the power control device comprises waking up a processor of the power control device, wherein the sensor is electrically connected to the processor and is configured to output the electrical signal to the processor in response to sensing that a current output by the fuse block is equal to or greater than a reference value.

According to an embodiment, the method may further include storing the wake-up vehicle controller in a memory of the power control device.

According to an embodiment, the method may further include determining whether a message transmitted from the wake-up vehicle controller is able to be received.

According to an embodiment, the method may further include, when the message transmitted from the wake-up vehicle controller can be received, determining a first wake-up controller based on the message transmitted from the wake-up vehicle controller.

According to an embodiment, the method may further include, when the message transmitted from the wake-up vehicle controller cannot be received, waking up a communication control device to wake up.

According to an embodiment, waking up the communication control device includes outputting an electrical signal to the communication control device.

According to an embodiment, the method may further include receiving a message transmitted from the wake-up vehicle controller through the communication control device, and determining the first wake-up controller based on the message received through the communication control device.

According to an embodiment, the method may further include receiving a message from each vehicle controller maintained in a communication state and determining a non-sleep cause based on the received message, when communication of the vehicle controller is maintained at a time point at which a specific time is elapsed after the first wake-up controller is determined.

According to an embodiment, the method may include outputting the first wake-up controller and the non-sleep cause.

BRIEF DESCRIPTION OF THE DRAWINGS

The above and other objects, features and advantages of the present disclosure should be more apparent from the following detailed description taken in conjunction with the accompanying drawings, in which.

DETAILED DESCRIPTION

Hereinafter, embodiments of the present disclosure are described in detail with reference to accompanying drawings. In the accompanying drawings, t the identical or equivalent components are designated by the identical numeral even when the components are displayed on different drawings. In addition, in the following description, when it was determined that a detailed description of well-known features or functions may obscure the gist of the present disclosure, the detailed description thereof has been omitted.

In describing the components of the embodiment according to the present disclosure, terms such as first, second, "A", "B", "(a)", "(b)", and the like may be used. These terms are merely intended to distinguish one component from another component. The terms do not limit the nature, sequence or order of the constituent components. In addition, unless otherwise defined, all terms used herein, including technical or scientific terms, have the same meanings as those generally understood by those having ordinary skill in the art to which the present disclosure pertains. Such terms as those defined in a generally used dictionary should be interpreted as having meanings same as the contextual meanings in the relevant field of art, and are not to be interpreted as having ideal or excessively formal meanings unless clearly defined as having such in the present disclosure.

When a component, device, element, or the like of the present disclosure is described as having a purpose or performing an operation, function, or the like, the component, device, or element should be considered herein as being "configured to" meet that purpose or to perform that operation or function.

Figure 1:
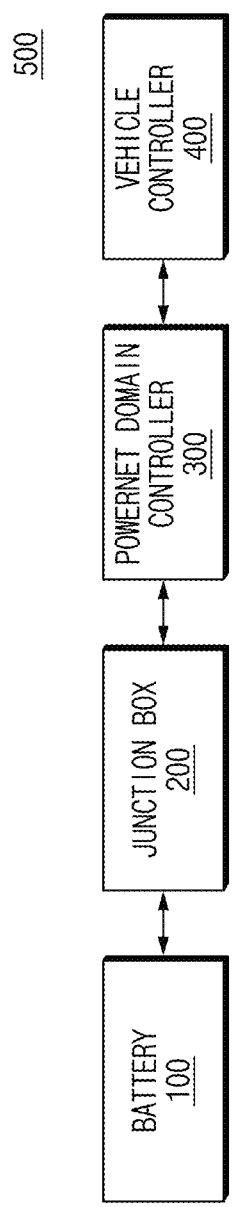
FIGS. 1 and 2 are views illustrating the configuration of a system for controlling a vehicle, according to embodiments of the present disclosure.
Figure 2:
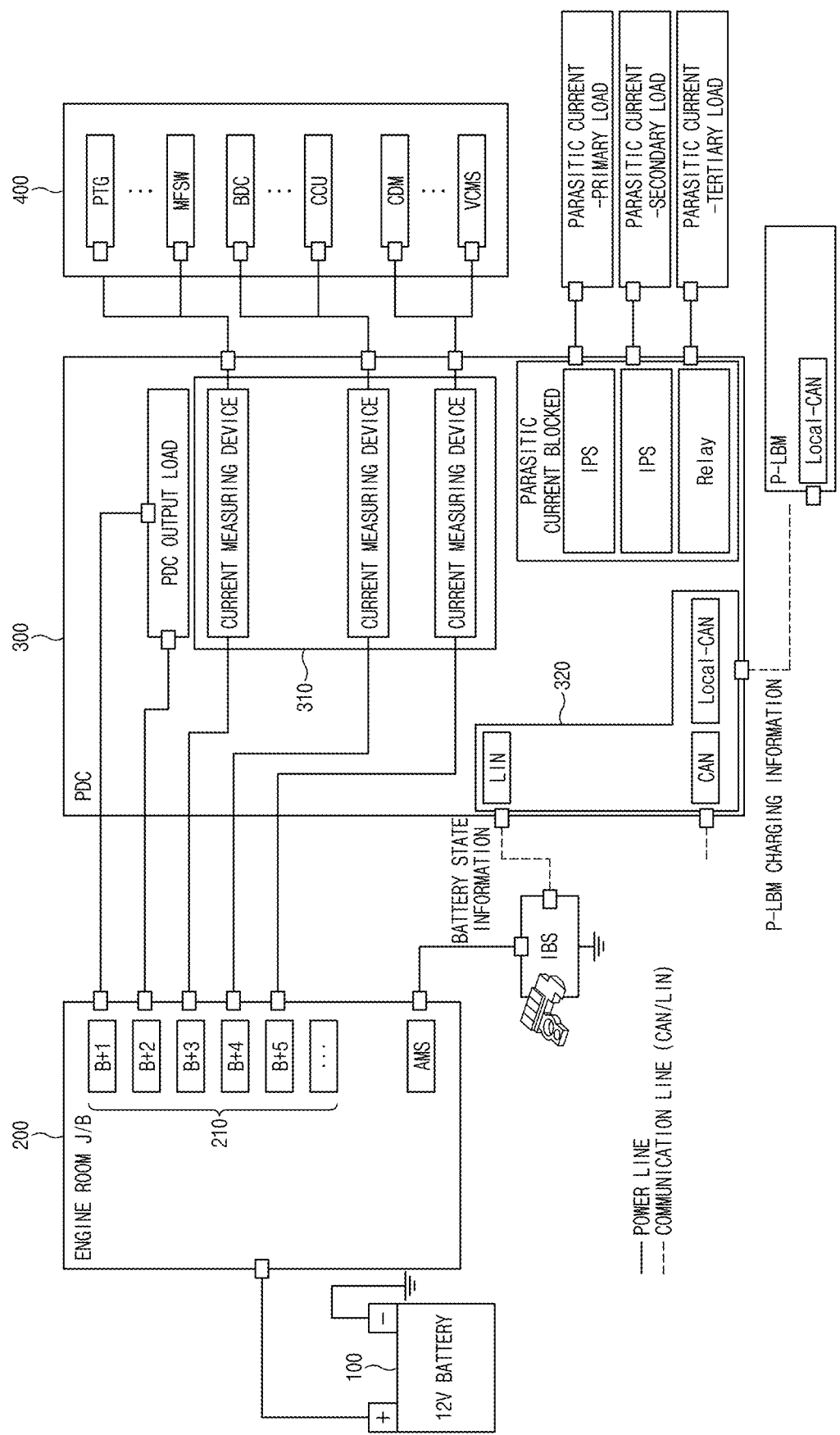

FIGS. 1 and 2 are views illustrating the configuration of a system for controlling a vehicle, according to embodiments of the present disclosure.

As illustrated in FIG. 1, a system (sometimes referred to herein as the "vehicle control system") 500 for controlling a vehicle may include a battery 100, a junction box 200, a power control device (sometimes referred to herein as the "powernet domain controller") 300, and a vehicle controller 400.

The battery 100 may include a 12 V low-voltage battery, according to an embodiment. The battery 100 may supply constant power to the vehicle controller after a key-off state is activated, such that the vehicle controller operates even after activation of the key-off state (start-off) of the vehicle.

The junction box 200 may include a plurality of fuse blocks to supply power to a plurality of vehicle controllers. According to an embodiment, as illustrated in FIG. 2, the junction box 200 may include a plurality of fuse blocks 210 provided for multiple domains to supply battery power for each domain classified based on a vehicle function.

The powernet domain controller 300 may control a power supply to transmit the battery power supplied through the junction box to the vehicle controller. According to an embodiment, as illustrated in FIG. 2, the powernet domain controller 300 may include a PDC output load connected to the fuse block 210 included in the junction box 200 for each of the multiple domains. The powernet domain controller 300 may also include a sensor 310 including a plurality of current measuring devices configured to measure the current of the fuse blocks 210. In addition, the powernet domain controller 300 may include a parasitic current blocking device configured to block i) parasitic current supplied to a parasitic current load through a relay and ii) parasitic current supplied to a parasitic current load through an intelligent power switch (IPS). The powernet domain controller 300 may further include a communication device 320 that may acquire battery state information via controller area network (CAN) communication with an auxiliary power battery (e.g., parking-lithium battery module), where the auxiliary power battery may be provided to perform a charging/discharging operation suitable for a vehicle environment separately from the battery 100. The communication device 320 may also perform local interconnect network (communication with an intelligent battery sensor (IBS) to diagnose the battery state by measuring a battery current, a battery voltage, and a battery temperature. The powernet domain controller 300, according to an embodiment, is described in more detail below with reference to FIG. 3.

The vehicle controller 400 may include a vehicle electronic control device receiving power from the battery 100 to operate even after activation of the key-off state. According to an embodiment, the vehicle controller 400 may include a power tail gate, a multifunction switch, a body domain controller (BDC), a communication control device (communication control unit (CCU)), a collision damage mitigation, and/or a vehicle charging management system.

Figure 3:
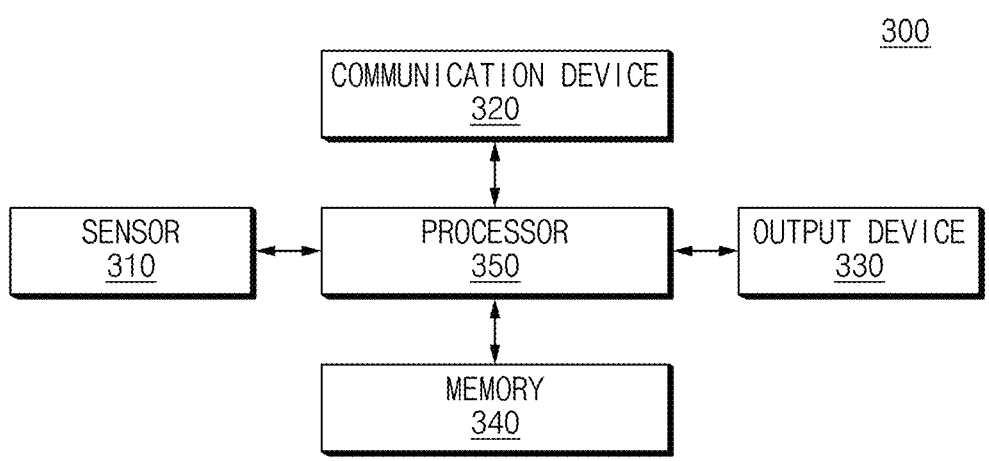
FIG. 3 is a view illustrating the configuration of a powernet domain controller, according to an embodiment of the present disclosure.

FIG. 3 is a view illustrating the configuration of a powernet domain controller, according to an embodiment of the present disclosure.

As illustrated in FIG. 3, the powernet domain controller 300 may include the sensor 310, the communication device 320, an output device 330, a memory 340, and a processor 350.

The sensor 310 may include a current measuring device to measure current between the fuse block 210 and the vehicle controller 400. The sensor 310 may sense a change in the current. When the change in the current is sensed, the sensor 310 may output an electrical signal through a cable or a wire (e.g., electric wire) connecting to the processor 350. According to an embodiment, the change in current is sensed when the current is equal to or greater than a reference value. When the change in current is sensed, the sensor 310 may output (locally input) a signal (e.g., a current signal) to an input pin of the processor 350 to wake up the processor 350.

The communication device 320 may perform CAN communication and local LIN communication. In addition, the powernet domain controller 300 may acquire battery state information by via CAN communication with an auxiliary power battery (e.g., parking-lithium battery module), where the auxiliary power battery is provided to perform a charging/discharging operation to be suitable for a vehicle environment. The powernet domain controller 200 may also communicate with an intelligent battery sensor (IBS) via LIN communication, where the IBS is provided to diagnose the battery state by measuring a battery current, a battery voltage, and a battery temperature.

The output device 330 may output an image or a sound under the control of the processor 350. According to an embodiment, the output device 330 may allow an engineer to rapidly identify a cause of discharging the battery when the battery is discharged. The output device 330 may output the cause of non-sleep and a first wake-up controller (a vehicle controller first being in the waking-up state) determined by the processor 350. The output device 330 may thus allow the engineer to make an improvement plan. According to an embodiment, the output device 330 may be implemented using a display device or a sound output device. The display device may include a head up display (HUD) or cluster. According to an embodiment, the display device may be implemented with a display that employs a liquid crystal display (LCD) panel, a light emitting diode (LED) panel, an organic light emitting diode (OLED) panel, and/or a plasma display panel (PDP). The LCD may include a thin film transistor-LCD (TFT-LCD). The display device may be integrally realized through a touch screen panel (TSP).

The memory 340 may store at least one algorithm to compute or execute various instructions for the operation of the vehicle control device according to an embodiment of the present disclosure. According to an embodiment, the memory 340 may store at least one instruction executed by the processor 350. The at least one instruction may allow the vehicle control apparatus to operate according to embodiments of the present disclosure. The memory 340 may include at least one storage medium of at least one a flash memory, a hard disc, a memory card, a Read Only Memory (ROM), a Random Access Memory (RAM), an Electrically Erasable and Programmable ROM (EEPROM), a Programmable ROM (PROM), a magnetic memory, a magnetic disc, and/or an optical disc.

The processor 350 may be implemented by various processing devices, such as a microprocessor embedded therein with a semiconductor chip to operate or execute various instructions. The processor 350 may thus control the vehicle control system according to embodiments of the present disclosure. The processor 350 may be electrically connected to the sensor 310, the communication device 320, the output device 330, and the memory 340 through a wired cable and/or various circuits to transmit an electrical signal including a control command to execute an arithmetic operation or data processing related to a control operation and/or communication. The processor 350 may include at least one of a central processing unit, an application processor, a communication processor (CP), or the combination thereof.

Figure 4:
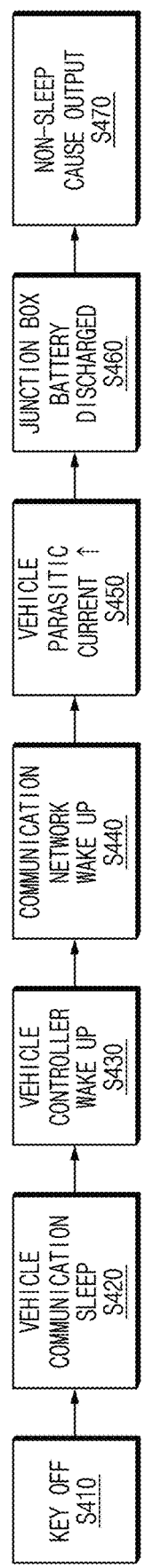
FIG. 4 is a view schematically illustrating the operation of a powernet domain controller, according to an embodiment of the present disclosure.

FIG. 4 is a view schematically illustrating the operation of a powernet domain controller, according to an embodiment of the present disclosure.

As illustrated in FIG. 4, when a key-off state is activated in an operation S410, the vehicle controller may enter into a sleep state in an operation S420.

When the vehicle controller wakes up after the sleep state in an operation S430, the consumption current of the vehicle controller is changed from a first current consumed in the sleep state to a second current consumed in a normal mode (wake-up mode). Accordingly, the sensor 310 may sense the change in current output from the fuse block when the vehicle controller wakes up after the sleep state.

According to an embodiment of the present disclosure, when the sensor 310 senses the change in current, the sensor 310 may allow the processor 350 to wake up by outputting an electrical signal through a cable or a wire (e.g., electric wire) connecting the sensor 310 to the processor 350. According to an embodiment, the sensor 310 may allow the processor 350 to wake up by outputting a current signal to the input pin of the processor 350. The state in which a powernet domain controller wakes up, according to an embodiment, is described in more detail below with reference to FIG. 5.

Figure 5:
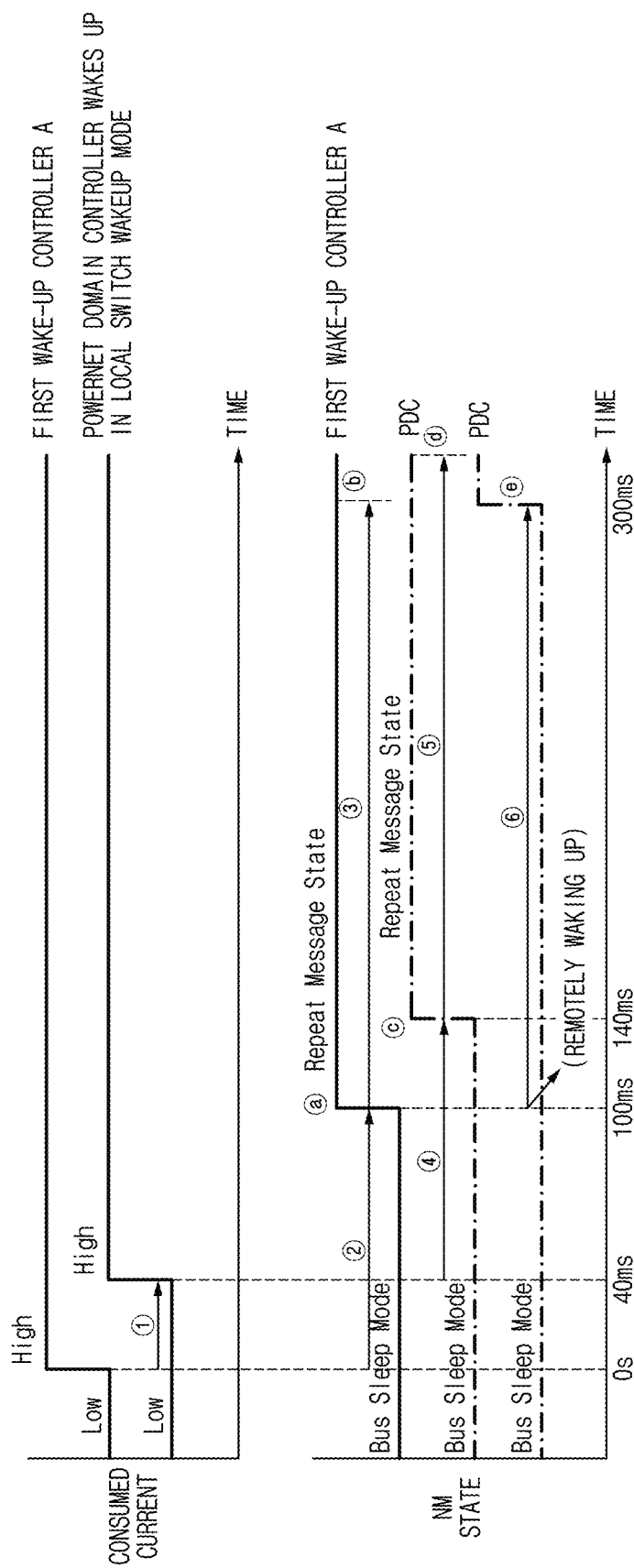
FIG. 5 is a view schematically illustrating the state in which a powernet domain controller wakes up, according to an embodiment of the present disclosure.

FIG. 5 is a view schematically illustrating the state in which a powernet domain controller wakes up, according to an embodiment of the present disclosure.

As illustrated in FIG. 5, when a vehicle controller "A" wakes up, the sensor 310 may sense the change in current by sensing the current consumed in the vehicle controller.

When the sensor 350 senses a change in current in the fuse block as the vehicle controller wakes up and, as a result, the current that is output by the fuse block is equal to or greater than a reference value, the sensor 310 may wake up the processor 350 by outputting an electrical signal through a cable or a wire (e.g., electric wire) connecting the sensor 310 to the processor 350. As the processor 350 wakes up, the current consumed in the powernet domain controller is changed. The processor 350 wakes up when the electrical signal is transmitted from the sensor 310. Accordingly, the processor 350 may wake up when a first specific time ① is elapsed after the vehicle controller "A" wakes up.

After waking up, the processor 350 may store, in the memory 340, an indication of the fuse block that is outputting the current that is equal to or greater than the reference value, when the processor 350 determines that the current that is equal to or greater than the reference value is sensed based on the current sensed by the sensor 310.

After the vehicle controller "A" wakes up, a network management (NM) message may be maintained in a "Bus Sleep Mode" for a second specific time ② (which is a time it takes to shift the state of the vehicle controller "A" to a "Repeat Message State").

The "Bus Sleep Mode" may refer to the state of an "Inactive Mode". In the "Bus Sleep Mode", the vehicle controller "A" may transmit the NM message and an "Application Message" (a message indicating the operating state of the controller).

The vehicle controller "A" may enter into the "Repeat Message State" when the second specific time is elapsed after waking up.

In this case, the "Repeat Message Stat" may refer to the "Active Mode", and the vehicle controller "A" may be able to transmit the NM message after entering into the "Repeat Message State".

The vehicle controller "A" may transmit or receive the "Application Message" from a time point ⓑ after a third specific time ③ (which is a time it takes to transmit the "Application Message" from a time point in which the vehicle controller "A" enters into the "Repeat Message State") is elapsed. The vehicle controller "A" may determine the NM message as being in a "Normal state" when the "Application Message" is able to be transmitted or received.

After the powernet domain controller 300 wakes up, the NM message may be maintained in the "Bus Sleep Mode" (in which neither the NM message nor the "Application Message" is able to be transmitted) for a fourth specific time ④ (which is a time it takes for the powernet domain controller 300 to be shifted to the "Repeat Message State" after waking up).

The powernet domain controller 300 may enter into the "Repeat Message State" when the fourth specific time is elapsed after waking up. The powernet domain controller 300 may transmit or receive the NM message after entering into the "Repeat Message State".

The powernet domain controller 300 may transmit or receive the "Application Message" after a time point ⓓ in which a fifth specific time ⑤ (which is a time it takes for the powernet domain controller 300 to transmit the "Application Message" after entering into the "Repeat Message State") is elapsed, from the time point ⓒ in which the powernet domain controller 300 enters into the "Repeat Message State".

According to an embodiment of the present disclosure, when the powernet domain controller 300 is woken up (hereinafter, a local switch wake up) by the electrical signal output from the sensor 310 sensing the change in current as the vehicle controller "A" wakes up, the powernet domain controller 300 wakes up when about 40 ms is elapsed after the vehicle controller "A" wakes up. The powernet domain controller 300 enters into the "Repeat Message State" when about 140 ms is elapsed after the vehicle controller "A" wakes up. The powernet domain controller 300 may then be able to transmit and receive the NM message.

When the powernet domain controller 300 is in the remote wakeup state (i.e., when the vehicle controller "A" wakes up and transmits the NM message to the powernet domain controller 300 while being in the "Repeat Message State" such that the message is transmitted on a CAN communication line and the communication control device 320 senses the message and outputs the electrical signal to the processor 350 to wake up the powernet domain controller 300), the powernet domain controller 300 wakes up about 100 ms after the vehicle controller "A" wakes up, and enters into the "Repeat Message State" at a time point ⓔ at which a sixth specific time ⑥ is elapsed from a time point at which the powernet domain controller 300 is remotely woken up by the NM message. In other words, the powernet domain controller 300 enters into the "Repeat Message State" after a time (about 200 ms) it takes to be shifted in the "Repeat Message State" from a time point at which the vehicle controller "A" is woken up by the NM message. Accordingly, according to an embodiment of the present disclosure, the communication state of the powernet domain controller 300 in the local switch wakeup state may be shifted to the "Repeat Message State" more quickly as compared with the remote wakeup state.

Accordingly, according to an embodiment of the present disclosure, the powernet domain controller 300 in the local switch wakeup state is rapidly shifted to the "Repeat Message State" in which the NM message is able to be transmitted and received. Accordingly, the powernet domain controller 300 may determine the first wake-up controller by receiving the message transmitted from the vehicle controller "A" before the vehicle controllers over the same network as the vehicle controller "A" in the wake-up state also wake up. According to an embodiment of the present disclosure, the vehicle controller "A" may be determined as a first wake-up controller.

In an embodiment, the powernet domain controller 300 may not be directly connected to all networks for communication because the powernet domain controller 300 may be able to use only a specific network for communication. Accordingly, when the powernet domain controller 300 fails to receive a message from a vehicle controller waking up even though the powernet domain controller 300 transmits and receives the NM message, the vehicle controller waking up may be determined as being connected to a network (another network) different from the specific network for communication.

The powernet domain controller 300 may allow the communication control device (or CCU) to wake up by outputting an electrical signal to the communication control device when the powernet domain controller 300 determines that the vehicle controller waking up is able to communicate over the other network different from the specific network for communication. According to an embodiment of the present disclosure, the communication control device may be connected to all networks for communication.

The powernet domain controller 300 may allow the communication control device to wake up at a time point earlier than a time point at which the communication control device wakes up using the remote wakeup manner, because the powernet domain controller 300 wakes up the communication control device to wake up in the local switch wakeup manner. The state in which a communication control device wakes up, according to an embodiment, is described in more detail below with reference to FIG. 6.

Figure 6:
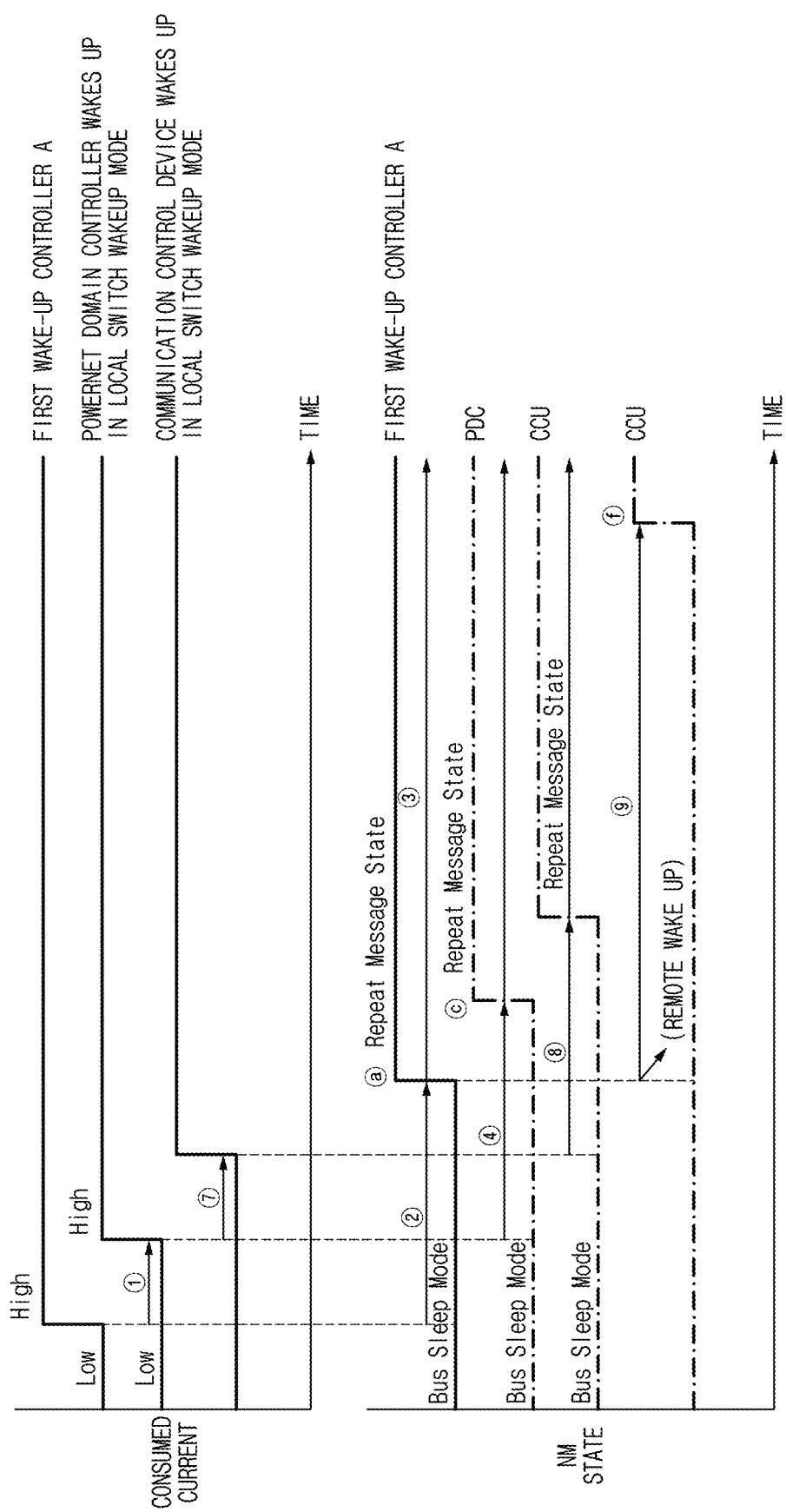
FIG. 6 is a view schematically illustrating the state in which a communication control device wakes up, according to an embodiment of the present disclosure.

FIG. 6 is a view schematically illustrating the state in which a communication control device wakes up, according to an embodiment of the present disclosure.

As illustrated in FIG. 6, the sensor 310 may sense a change in current consumed by the vehicle controller after the vehicle controller "A" wakes up. When the sensor 310 senses a change in current, the sensor 310 may wake up the processor 350 by outputting an electrical signal through a cable or a wire (e.g., electric wire) connecting the sensor 310 to the processor 350.

Although the processor 350 wakes up and is shifted to the "Repeat Message State" in which the processor 350 is able to transmit or receive the NM message, the processor 350 may not receive the message from the vehicle controller "A" in the wake-up state. In this case, the processor 350 may determine that the vehicle controller "A" is connected to the network different from the specific network for communication. Accordingly, the processor 350 may wake up the communication control device.

According to an embodiment, when, after the processor 350 enters into the "Repeat Message State", the processor 350 fails to receive a message from the vehicle controller "A" that wakes up, the processor 350 may wake up the communication control device by outputting an electrical signal through a cable or a wire (e.g., electric wire) connecting the powernet domain controller 300 to the communication control device. As the communication control device wakes up, the current consumed by the communication control device is changed. Since the communication control device is woken up by the electrical signal output from the powernet domain controller 300, the communication control device may wake up when a seventh specific time ⑦ is elapsed after the powernet domain controller 300 wakes up.

The communication control device may be maintained in the "Bus Sleep Mode" (in which the NM message and the "Application Message" are all difficult to transmit/receive) for the eighth specific time ⑧ (which is a time it takes for the communication control device to be shifted to the "Repeat Message State" after waking up) after waking up. The communication control device may enter into the "Repeat Message State", and may transmit the NM message when the eighth specific time ⑧ is elapsed after waking up.

The communication control device remotely waking up may refer to a case in which the processor of the communication control device is woken up by an electrical signal output from the communication control device when the communication control device detects a message and outputs the electrical signal to the processor. In an embodiment, the message is transmitted on a CAN communication line by an electronic device in the "Repeat Message State" after waking up.

In other words, the communication control device is shifted to the "Repeat Message State" when a ninth specific time ⑨ is elapsed from the time point ⓐ at which the second specific time is elapsed after the vehicle controller "A" wakes up.

Accordingly, according to an embodiment of the present disclosure, the communication control device may be more rapidly shifted to the "Repeat Message State" in the local switch wakeup manner as compared to the remote wake up manner. Thus, according to an embodiment of the present disclosure, the communication control device waking up in the local switch wakeup manner is rapidly shifted to the "Repeat Message State" to transmit and receive the NM message. Accordingly, the communication control device may determine the first wake-up controller by receiving a message transmitted from the vehicle controller "A" waking up over another network. According to an embodiment of the present disclosure, the communication control device may determine the vehicle controller "A" as the first wake-up controller.

Referring back to FIG. 4, as indicated in a block S440, as the vehicle controller wakes up, the communication network employed in the vehicle controller waking up also wakes up. Accordingly, other vehicle controllers configured to communicate over the same network as that of the vehicle controller waking up may also wake up.

The processor 350 may determine whether the communication network is maintained after a specific time is elapsed after the activation of the key-off state.

The processor 350 may collect relevant data for each vehicle controller, in the state in which the communication network is maintained. According to an embodiment, the processor 350 may monitor the NM message from the vehicle controller in the state on which the communication network is maintained. The details thereof are described below with reference to FIG. 7.

Figure 7:
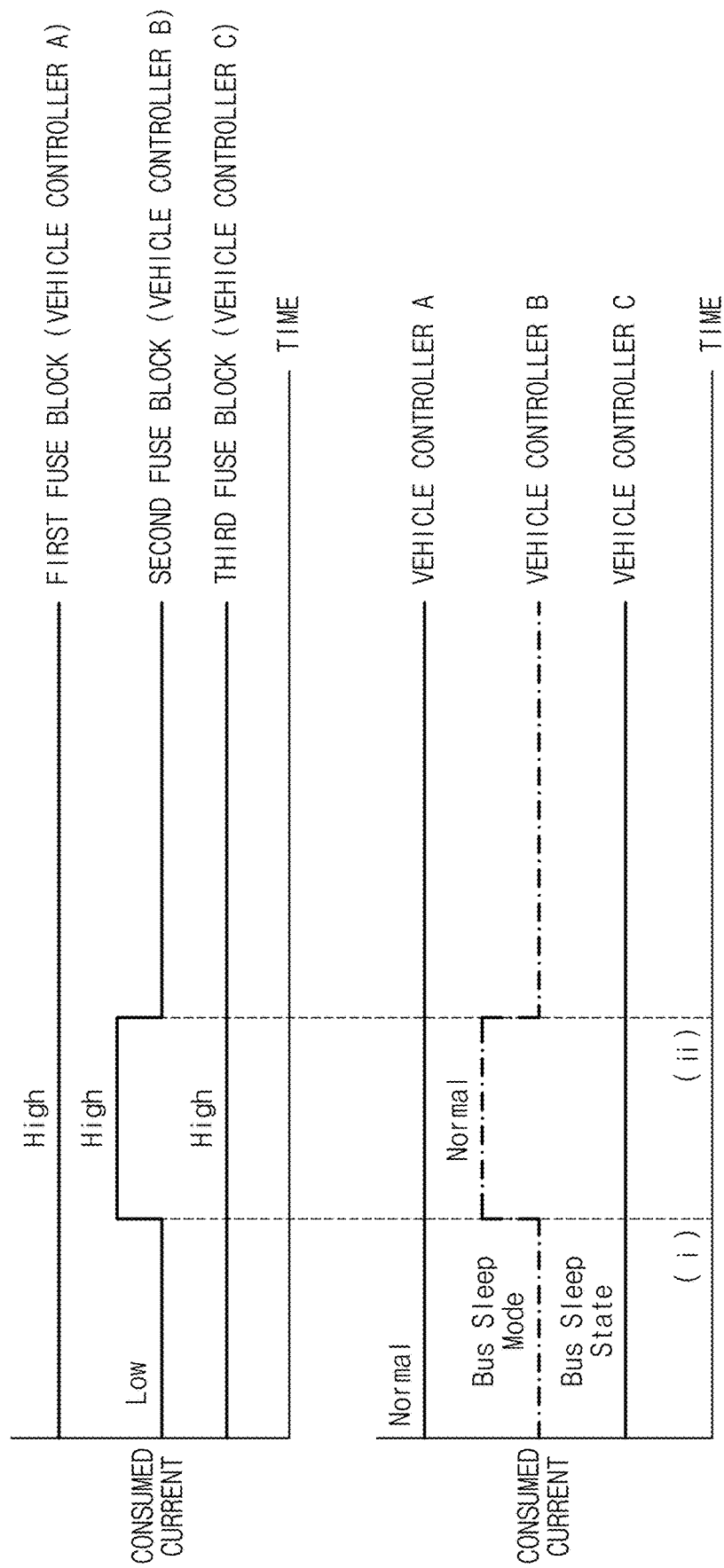
FIG. 7 is a view illustrating the state of a non-sleep controller, according to an embodiment of the present disclosure.

FIG. 7 is a view illustrating the state of a non-sleep controller, according to an embodiment of the present disclosure.

As illustrated in FIG. 7, the first vehicle controller "A" may be connected to a first fuse block, a second vehicle controller "B" may be connected to a second fuse block, and a third vehicle controller "C" may be connected to a third fuse block.

When the same output current is sensed from the first fuse block and the third fuse block after a specific time is elapsed from the key-off state, the processor 350 may determine communication as being maintained for the first vehicle controller "A" and the third vehicle controller "C".

When the current output from the second fuse block is increased at the first time point (i) and decreased at the second time point (ii), the processor 350 may determine the communication as being maintained as the second vehicle controller wakes up between the first time point (i) and the second time point (ii).

When the processor 350 determines the communication as being maintained in the vehicle controller even after the specific time is elapsed from the key-off state, the processor 350 may determine the vehicle controller in the state that the communication is maintained, as a non-sleep controller, and may monitor the NM message of the vehicle controller.

The processor 350 may determine a non-sleep cause for each vehicle controller based on the NM message.

According to an embodiment, the processor 350 may determine the first vehicle controller "A" as transmitting and receiving the NM message and the "Application Message" in response to determining the NM message of the first vehicle controller "A" as being in the "Normal State". The processor 350 may determine the operating state of the first vehicle controller based on the "Application Message" of the first vehicle controller. For example, the "Application Message" may include a message corresponding to the operation such as a lightening operation of a lamp and an opening operation of a door. The processor 350 may determine the first vehicle controller "A" as a non-sleep controller due to the spontaneous non-sleep cause.

The processor 350 may determine the third vehicle controller "C" as transmitting and receiving the NM message when the NM message of the third vehicle controller "C" is determined as being in the "Repeat Message State". In addition, since the third vehicle controller "C" is not in the state of transmitting and receiving the "Application Message", the processor 350 may determine the third vehicle controller "C" as waking up due to the communication of the first vehicle controller "A".

The processor 350 may determine the second vehicle controller "B" as normally entering into the sleep mode after the second time point.

The processor 350 may store an indication of the non-sleep controller in the memory 340 together with the non-sleep cause.

According to an embodiment, the processor 350 may store an indication of the first vehicle controller "A" and an indication of the third vehicle controller "C" serving as the non-sleep controllers, in the memory 340, together with the non-sleep cause. According to an embodiment, the processor 350 may store the non-sleep cause of the first vehicle controller "A" as the operations such as the lightening operation of the lamp or the opening operation of the door. The processor 350 may store the non-sleep cause of the third vehicle controller "C" as the waking-up operation of the first vehicle controller "A".

Referring back to FIG. 4, as indicated in a block S450, the processor 350 may determine the parasitic current of the vehicle as being increased by the non-sleep controller when the processor 350 determines a vehicle controller being in a non-sleep state (the state in which the communication is maintained). The processor 350 may store an indication of a fuse block related to current consumption sensed.

In addition, as indicated in a block S460, when the state of charge of the battery is decreased to be less than a threshold value, as the parasitic current is increased, the processor 350 may determine the battery as being discharged.

As indicated in a block S470, when the processor 350 determines the battery as being discharged, the processor 350 may output the non-sleep cause stored in the memory 340.

The processor 350 may allow an engineer to identify the non-sleep cause stored in the memory 340 to enable the engineer to solve a discharging problem based on the cause of discharging the battery.

Figure 8:
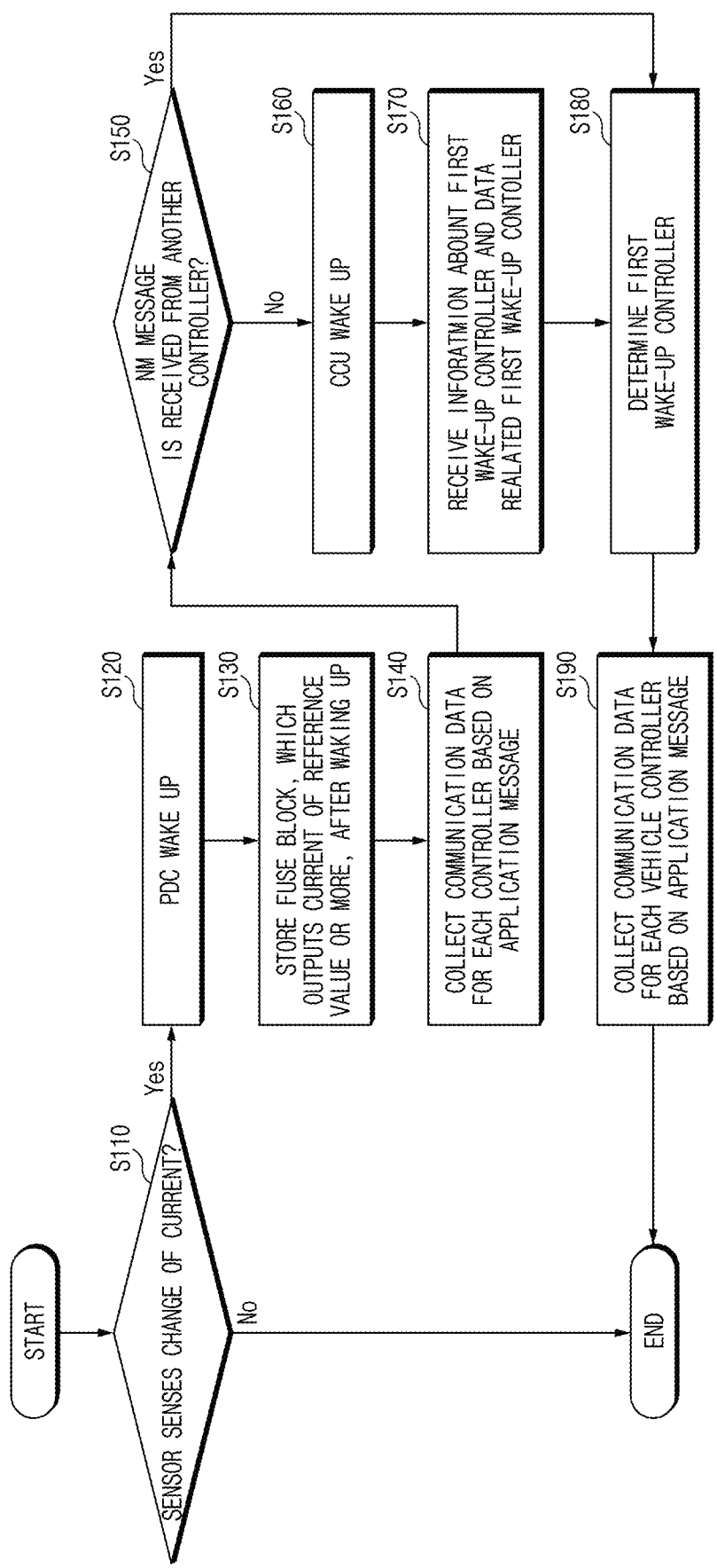
FIGS. 8 and 9 are flowcharts illustrating a method for controlling a vehicle, according to an embodiment of the present disclosure.
Figure 9:
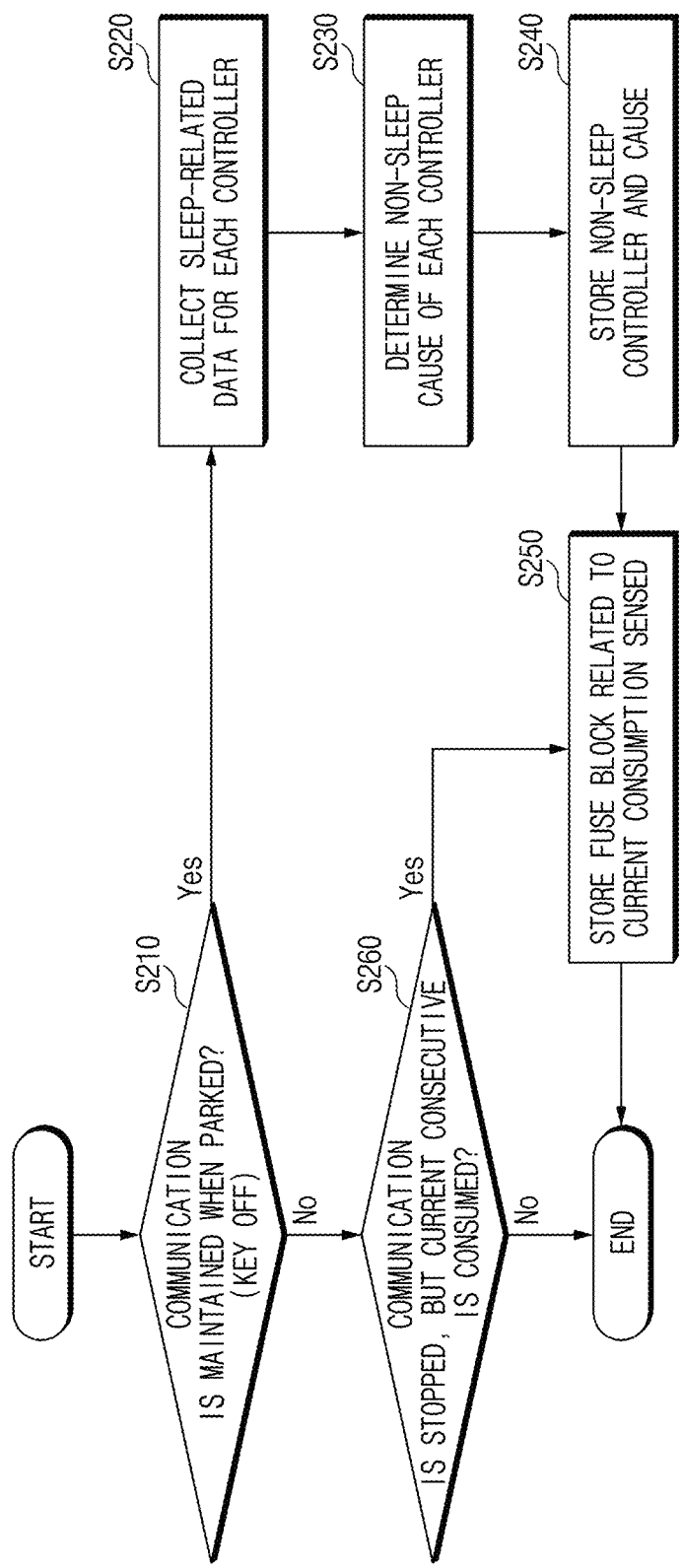

FIGS. 8 and 9 are flowcharts illustrating a method for controlling a vehicle, according to an embodiment of the present disclosure.

As illustrated IN FIG. 8, in a step or operation S110, the sensor 310 may sense a change in current output from a fuse block when a vehicle controller wakes up after being in a sleep state.

When the vehicle controller wakes up after being in the key-off state and entering in the sleep state, the current consumption of the vehicle controller is changed from a first current consumed in the sleep state to a second current consumed in the normal mode (wake-up mode). Accordingly, when the vehicle controller wakes up after being in the sleep state, current that is equal to or greater than a reference value begins flowing through the fuse block. In this case, the sensor 310 may determine that the change of current is sensed in the fuse block.

According to an embodiment of the present disclosure, when the sensor 310 senses the change in current in the step or operation S110, the processor 350 of the powernet domain controller 300 may be woken up in a step or operation S120 by an electrical signal output by the sensor 310 through a cable or a wire (e.g., electric wire) connecting the sensor 310 to the processor 350. According to an embodiment, the sensor 310 may allow the processor 350 to wake up by outputting a signal (e.g., a current signal) to the input pin of the processor 350.

In a step or operation S130, after waking up, the processor 350 may store, in the memory 340, an indication of the fuse block that outputs the current that is equal to or greater than the reference value or more.

In a step or operation S140, the processor 350 may monitor the NM message transmitted or received over a specific network (e.g., B-Can) in which the communication device 320 is able to make communication.

In the step or operation S140, the processor 350 may enter into the Repeat Message State after the fifth specific time is elapsed after waking up as illustrated in FIG. 5. The processor 350 may thus transmit and receive an NM message, and may monitor the received NM message.

In a step or operation S150, the processor 350 may determine whether the NM message is received in the vehicle controller.

When the NM message is determined as being received in the step or operation S150, the processor 350 may determine the vehicle controller, that transmitted the NM message, as communicating over the same network as that of the powernet domain controller. In addition, the processor 350 may determine the vehicle controller, that transmitted the NM message, as the first wake-up controller.

The processor 350 may transmit and receive the "Application Message" after the time point ⓓ at which the fifth specific time is elapsed, from the time point ⓒ at which the processor 350 enters into the "Repeat Message State", as illustrated in FIG. 5.

In a step or operation S190, the processor 350 may collect communication data for each vehicle controller, based on the "Application Message", when receiving the "Application Message" from the vehicle controller.

When the processor 350 determines the NM message as not being received in the step or operation S150, the processor 350 may determine the vehicle controller that transmitted the NM message as communicating over a network different from that of the powernet domain controller 300. Accordingly, the processor 350 may not communicate via a direct connection with the vehicle controller that transmitted the NM message.

In a step or operation S160, the processor 350 may wake up a communication control device by outputting an electrical signal to the communication control device (e.g., CCU). According to an embodiment of the present disclosure, the communication control device may be connected to all networks for communication.

According to an embodiment, the processor 350 may allow the communication control device to wake up in the local switch wakeup manner.

The processor 350 may allow the communication control device to wake up by outputting the electrical signal through a cable or a wire (e.g., electric wire) connecting the powernet domain controller 300 to the communication control device.

In a step or operation S170, when the communication control device is shifted to the "Repeat Message State" after waking up to transmit and receive the NM message, the communication control device may receive the NM message transmitted by the vehicle controller.

The communication control device may transmit the NM message, received from the vehicle controller that has woken up, to the powernet domain controller 300. In a step or operation S180, when the processor 350 receives the NM message, the processor 350 may determine the vehicle controller, that transmitted the NM message, as the first wake-up controller.

When the communication control device transmits an "Application Message" to the powernet domain controller, the processor 350 may collect communication data for each vehicle controller, based on the "Application Message," in a step or operation 190.

As the vehicle controller wakes up, the communication network employed in the vehicle controller waking up also wakes up. Accordingly, vehicle controllers communicating over the same network as that of the vehicle controller waking up may also wake up.

Referring now to FIG. 9, in a step or operation S210, the processor 350 may determine whether the communication network is maintained after a specific time is elapsed from the key-off state.

The processor 350 may determine, as the non-sleep controller, the vehicle controller in which the communication network is maintained, in the state in which the communication network is maintained.

In a step or operation S220, the processor 350 may collect sleep-related data for each vehicle controller. According to an embodiment, the processor 350 may monitor the NM message from the vehicle controller in the state in which the communication network is maintained.

The processor 350 may determine a non-sleep cause for each vehicle controller based on the NM message.

According to an embodiment, the processor 350 may determine the first vehicle controller "A" as transmitting and receiving the NM message and the "Application Message" when the processor 350 determines the NM message of the first vehicle controller "A" as being in the "Normal State". The processor 350 may determine the operating state of the first vehicle controller based on the "Application Message" of the first vehicle controller. For example, the "Application Message" may include a message corresponding to the operation such as a lightening operation of a lamp and an opening operation of a door. The processor 350 may determine the first vehicle controller as a non-sleep controller due to the spontaneous non-sleep cause.

The processor 350 may determine the third vehicle controller as transmitting and receiving the NM message when the NM message of the third vehicle controller is determined as being in the "Repeat Message State". In addition, since the third vehicle controller is not in the state of transmitting and receiving the "Application Message", the processor 350 may determine the third vehicle controller as waking up due to the communication of the first vehicle controller.

In a step or operation S240, the processor 350 may store an indication of the non-sleep controller in the memory 340, together with the non-sleep cause.

In the step or operation S240, according to an embodiment, the processor 350 may store an indication of the first vehicle controller "A" and the third vehicle controller "C" serving as the non-sleep controllers, in the memory 340, together with the non-sleep cause. According to an embodiment, the processor 350 may store an indication of the non-sleep cause of the first vehicle controller as the operations such as the lightening operation of the lamp or the opening operation of the door. The processor 350 may store the non-sleep cause of the third vehicle controller "C" as the waking-up operation of the first vehicle controller "A".

In a step or operation S250, the processor 350 may store the fuse block related to current consumption sensed.

When the processor 350 determined in the step or operation S210 that the communication of the vehicle controller is not maintained, the processor 350 may determine, in a step or operation S260, whether the current consumption is sensed, although the communication of the vehicle controller is not maintained, when the communication of the vehicle controller is not maintained after the key off state is entered.

In the step or operation S250, the processor 350 may store an indication of the fuse block related to current consumption sensed.

Thereafter, when determining the battery as being discharged, as the state of charge of the battery is decreased to less than a threshold value due to the current consumption, the processor 350 may output the non-sleep cause stored in the memory 340. The processor 350 may allow an engineer to identify the non-sleep cause stored in the memory 340 such that the engineer solves a discharging problem based on the cause of discharging the battery.

Figure 10:
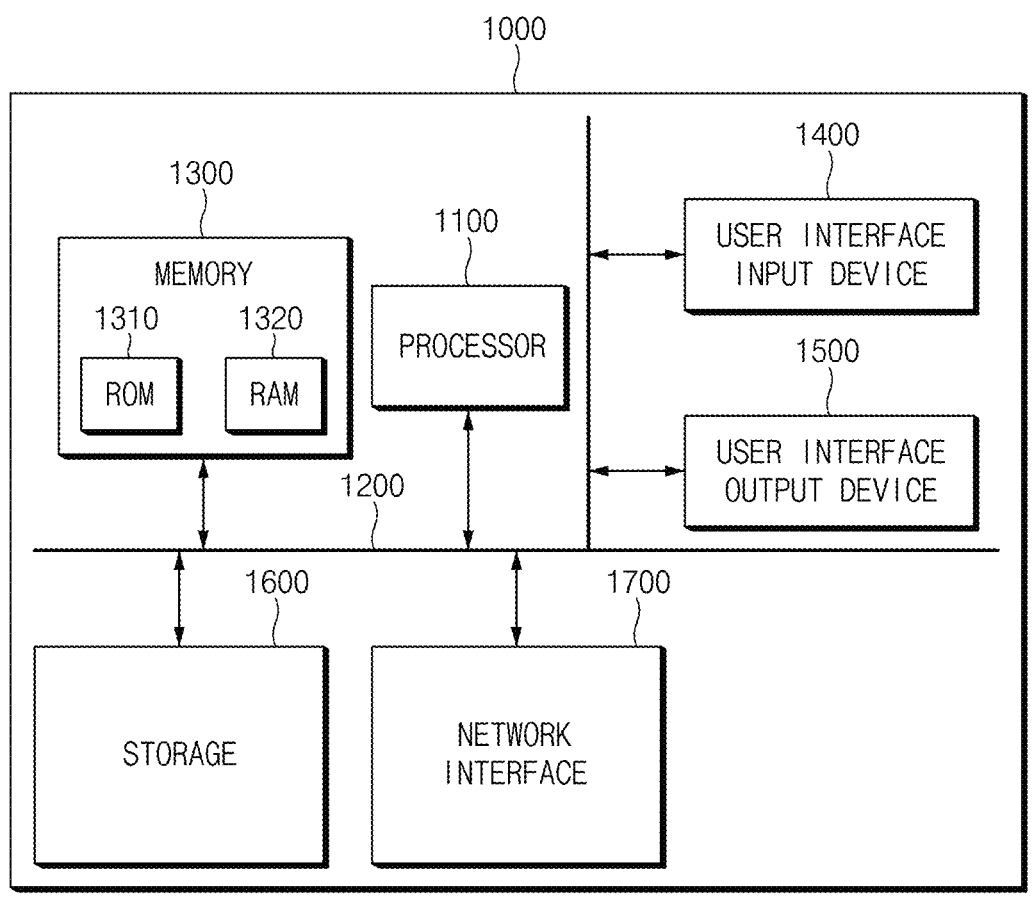
FIG. 10 is a view illustrating the configuration of a computing system configured to execute a method according to an embodiment of the present disclosure.

FIG. 10 is a view illustrating the configuration of a computing system that may execute a method according to an embodiment of the present disclosure.

Referring to FIG. 10, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only ROM 1310 and a RAM 1320.

Thus, the operations of the methods or algorithms described in connection with the embodiments of the present disclosure may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM). The storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

As described above, according to an embodiment of the present disclosure, in a system and a method for controlling the vehicle, a powernet domain controller is woken up when a change in current consumed by a vehicle controller employing a low-voltage battery as a power supply is sensed. The power domain controller thus determines the first wake-up controller so that the cause of discharging the battery is detected.

According to an embodiment of the present disclosure, in the system and the method for controlling the vehicle, the sleep state of vehicle controllers in the wake-up state may be monitored by the first wake-up controller, and the cause of making non-sleep vehicle controllers fail to sleep may be detected, after the first wake-up controller is determined.

According to an embodiment of the present disclosure, in the system and the method for controlling the vehicle, when the cause of discharging the battery is detected, the cause of discharging the battery may be stored and output through an output device, thereby reducing the costs and time spent to analyze the cause of discharging the battery. In addition, an engineer may rapidly determine the controller to be solved in the cause of discharging the battery.

The above description is merely an example of the technical idea of the present disclosure, and various modifications and variations may be made by one having ordinary skill in the art without departing from the essential characteristic of the present disclosure.

Therefore, the embodiments of the present disclosure are provided to explain the spirit and scope of the present disclosure, but not to limit them. The spirit and scope of the present disclosure is not limited by the embodiments. The scope of the present disclosure should be construed on the basis of the accompanying claims, and all the technical ideas within the scope equivalent to the claims should be included in the scope of the present disclosure.

Hereinabove, although the present disclosure has been described with reference to embodiments and the accompanying drawings, the present disclosure is not limited thereto, but may be variously modified and altered by those having ordinary skill in the art to which the present disclosure pertains without departing from the spirit and scope of the present disclosure claimed in the following claims.

What is claimed is:

1. A system comprising:
    a fuse block connected to a vehicle controller and configured to supply power to the vehicle controller; and
    a power control device including a sensor and a processor, wherein:
        the sensor is configured to sense a current of the fuse block connected to the vehicle controller, and
        the processor is configured to determine the vehicle controller as being a wake-up vehicle controller when an electrical signal is input from the sensor as change in current of the fuse block is sensed by the sensor.

2. The system wherein the sensor is electrically connected to the processor and is configured to output the electrical signal to the processor in response to sensing that a current output of the fuse block is equal to or greater than a reference value.

3. The system of claim 1, wherein the processor is configured to:
    store, in a memory, an indication of the wake-up vehicle controller.

4. The system of claim 1, wherein the processor is configured to:
    determine whether a message transmitted from the wake-up vehicle controller can be received.

5. The system of claim 4, wherein the processor is configured to:
    when the message transmitted from the wake-up vehicle controller can be received, determine a first wake-up controller based on the message transmitted from the wake-up vehicle controller.

6. The system of claim 5, wherein the processor is configured to:
    when the message transmitted from the wake-up vehicle controller cannot be received, wake up a communication control device.

7. The system of claim 6, wherein the processor is configured to:
    wake up the communication control device by outputting an electrical signal to the communication control device.

8. The system of claim 6, wherein the processor is configured to:
    receive the message transmitted from the wake-up vehicle controller through the communication control device, and
    determine the first wake-up controller based on the message received through the communication control device.

9. The system of claim 8, wherein the processor is configured to:
    when communication of the vehicle controller is maintained at a time point at which a specific time is elapsed after the first wake-up controller is determined, receive a message from each vehicle controller maintained in a communication state and determine a non-sleep cause based on the received message.

10. The system of claim 9, wherein the processor is configured to:
    output the first wake-up controller and the non-sleep cause.

11. A method for controlling a vehicle, the method comprising:
    sensing, by a sensor, a current of a fuse block connected to a vehicle controller to supply power to the vehicle controller;
    waking up a power control device when an electrical signal is provided by the sensor as change in current of the fuse block is sensed by the sensor; and
    determining, by the power control device, the vehicle controller, connected to the fuse block related to the change in current, as being a wake-up vehicle controller.

12. The method of claim 11, wherein:
    waking up the power control device comprises waking up a processor of the power control device, wherein the sensor is electrically connected to the processor and is configured to output the electrical signal to the processor in response to sensing that a current output by the fuse block is equal to or greater than a reference value.

13. The method of claim 11, further comprising:
    storing an indication of the wake-up vehicle controller in a memory of the power control device.

14. The method of claim 11, further comprising:
    determining whether a message transmitted from the wake-up vehicle controller can be received.

15. The method of claim 14, further comprising:
    when the message transmitted from the wake-up vehicle controller is able to be received, determining a first wake-up controller based on the message transmitted from the wake-up vehicle controller.

16. The method of claim 15, further comprising:
    when the message transmitted from the wake-up vehicle controller cannot be received, waking up a communication control device.

17. The method of claim 16, wherein:
waking up the communication control device comprises outputting an electrical signal to the communication control device.

18. The method of claim 16, further comprising:
receiving a message transmitted from the wake-up vehicle controller through the communication control device; and
determining the first wake-up controller based on the message received through the communication control device.

19. The method of claim 18, further comprising:
receiving a message from each vehicle controller maintained in a communication state and determining a non-sleep cause based on the received message, when communication of the vehicle controller is maintained at a time point at which a specific time is elapsed after the first wake-up controller is determined.

20. The method of claim 19, further comprising:
outputting the first wake-up controller and the non-sleep cause.

* * * * *